United States Patent [19]

Schink et al.

[11] Patent Number: 5,736,193

[45] Date of Patent: Apr. 7, 1998

[54] SOLDERABLE WIRE-COATING COMPOSITIONS AND PROCESS FOR THE CONTINUOUS COATING OF WIRES

[75] Inventors: Michael Schink, Neu Wulmstorf; Klaus Wilhelm Lienert, Hamburg; Joachim Runge, Reinbek; Silvia Hentschel, Hamburg, all of Germany

[73] Assignee: BASF Lacke +Farben, AG, Muenster-Hiltrup, Germany

[21] Appl. No.: 492,105

[22] PCT Filed: Mar. 1, 1994

[86] PCT No.: PCT/EP94/00583

§ 371 Date: Sep. 5, 1995

§ 102(e) Date: Sep. 5, 1995

[87] PCT Pub. No.: WO94/20966

PCT Pub. Date: Sep. 15, 1994

[30] Foreign Application Priority Data

Mar. 12, 1993 [DE] Germany ............... 43 07 848.6

[51] Int. Cl.⁶ ............... B05D 5/12; C08F 8/30; C08G 18/10
[52] U.S. Cl. ............... 427/117; 427/120; 525/124; 252/182.2; 252/182.21; 528/44; 528/60; 524/108; 524/386
[58] Field of Search ............... 427/117, 120, 427/121, 372.2, 384; 525/124; 252/182.2, 182.21; 528/44, 48, 60, 65; 524/108, 386, 387

[56] References Cited

U.S. PATENT DOCUMENTS

| | | | |
|---|---|---|---|
| 3,988,283 | 10/1976 | Shelby et al. | 260/33.4 P |
| 4,104,235 | 8/1978 | Ohm | 260/33.2 R |
| 4,239,814 | 12/1980 | Nagel | 427/120 |
| 4,369,301 | 1/1983 | Knoig et al. | 528/45 |

FOREIGN PATENT DOCUMENTS

| | | | |
|---|---|---|---|
| WO 91/07469 | 3/1991 | European Pat. Off. | C09D 5/25 |
| 07469 | 5/1991 | European Pat. Off. | |

*Primary Examiner*—Shrive Beck
*Assistant Examiner*—Brian K. Talbot

[57] ABSTRACT

The present invention relates to solderable wire-coating compositions based on hydroxyl group-containing polyesters, blocked polyisocyanates, organic solvents and catalysts, which are characterized in that they contain A) from 7 to 25% by weight of hydroxyl group-containing polyesters, B) from 55 to 70% by weight of a fully blocked aromatic diisocyanate adduct or of a plurality of fully blocked aromatic diisocyanate adducts, C) from 0.1 to 3% by weight of catalysts, D) from 1 to 8% by weight of a polyol or of a plurality of polyols, and E) from 1 to 36.9% by weight of an alkylene carbonate or of a plurality of alkylene carbonates, the total weight of the wire-coating compositions in each case being 100% by weight.

The present invention also relates to a process for the continuous coating of wires using the solderable wire-coating compositions described.

9 Claims, No Drawings

SOLDERABLE WIRE-COATING COMPOSITIONS AND PROCESS FOR THE CONTINUOUS COATING OF WIRES

The present invention relates to solderable wire-coating compositions based on hydroxyl group-containing polyesters, blocked polyisocyanates, organic solvents and catalysts. The present invention also relates to a process for the continuous coating of wires using these solderable wire-coating compositions.

It is known to produce insulating, solderable coatings on electrical conductors. This term is understood to refer to coatings which, when the insulated electrical conductors are immersed in a solder bath heated to elevated temperature, are destroyed or detached to the extent that the conductor has been immersed in the bath, so that on these areas the bare metal is exposed and can be used directly for electrically conducting connections. For this purpose it is necessary for the insulating coating to be removed, on immersion in the solder bath, in as short a time as possible, in other words within a few seconds. The shorter this time, the easier it is to achieve final insulation and thus an industrially advantageous procedure.

Electrically insulating coatings based on hydroxyl group-containing polyesters and blocked isocyanates are known in large numbers and are described, for example, in DE-A-16 44 794 and DE-A-19 57 157. Electrically insulating coatings of this kind are notable in particular, when used as wire enamels, for their good insulating properties and for the fact that they are solderable (IEC 851-4, IEC 317-4). When immersed in a solder bath heated to elevated temperatures, solderable insulated wires undergo destruction of the insulating layer to expose the bare metal of the conductor, which is thus directly accessible for electrically conducting connections. A technical advantage can be obtained by the time for removing the insulating coat being as short as possible. The requirement of great thermal lability under the conditions of the solder bath is countered by the high thermal stability required of coated wires for use in electrical components, for example electrical transistors or transformers. Whereas the solderability is to be attributed to the presence of urethane groups in the coating film, the heat resistance is decisively influenced by the choice of polyester. In this context, polyesters of aromatic dicarboxylic acids result in a particularly good temperature index and a good resistance of the resulting coatings to thermal shock (IEC 851-6).

The organic solvents which are predominantly used for solderable wire enamels based on hydroxyl group-containing polyesters and blocked polyisocyanates are phenols, in particular cresols and xylenols. However, the use of these cresolic or phenolic solvents is associated with numerous problems, for example odor nuisance and environmental hazard because of the toxicity of these solvents when such wire enamels are applied. Indeed, attempts are being made to replace these cresolic and phenolic solvents by other suitable organic solvents.

Moreover, the efforts are aimed at providing wire enamels having as high as possible a solids content.

Japanese Laid-Open Application No. 58-101162 discloses solderable wire-coating compositions based on blocked polyisocyanates, hydroxyl group-containing polyesters, organic solvents and acetylacetonate-metal complex catalysts. The solvent content of the wire-coating compositions described is below 40% by weight, based on the sum of blocked polyisocyanate, hydroxyl group-containing polyester and organic solvent. In the examples of JP-A-58-101162 the solvent used is exclusively cresol. However, the use of cresols is associated with numerous problems, such as odor nuisance and environmental hazards because of the toxicity of the cresol when cresolic wire enamels are applied. It emerges from the Japanese Laid-Open Application that wire enamels based on hydroxyl group-containing polyesters, blocked polyisocyanates, cresol and heavy metal naphthenates instead of acetylacetonate-metal complex catalysts lead to turbid coating compositions which, after application to wires, result in coatings with poor properties.

The present invention was thus based on the object of providing solderable wire-coating compositions which are highly viscous at room temperature ("hot melt resins") and which avoid the stated disadvantages of the known wire-coating compositions. With particular regard to economic and ecological considerations, the wire-coating compositions should be capable of being applied from the melt to wires in systems provided for this purpose. In particular, the wire-coating compositions should have as high as possible a solids content, and should be stable on storage and substantially free from cresols. The wires coated from the melt should have, in particular, a flux time which is brief, or improved with respect to the prior art, and the resulting coatings should possess good adhesion to copper wires and an adequate thermal shock.

This object is achieved surprisingly by solderable wire-coating compositions based on hydroxyl group-containing polyesters, blocked polyisocyanates, organic solvents and catalysts, the wire-coating compositions being characterized in that they contain A) from 7 to 25% by weight of hydroxyl group-containing polyesters, B) from 55 to 70% by weight of a fully blocked aromatic diisocyanate adduct or of a plurality of fully blocked aromatic diisocyanate adducts, C) from 0.1 to 3% by weight of catalysts, D) from 1 to 8% by weight of a polyol or of a plurality of polyols, and E) from 1 to 36.9% by weight of an alkylene carbonate or of a plurality of alkylene carbonates, the total weight of the wire-coating compositions in each case being 100% by weight.

The present invention also relates to processes for the continuous coating of wires, in which these wire-coating compositions are applied to the surface of the wire and are then baked.

It is surprising, and was not foreseeable, that formulations of hydroxyl group-containing polyesters with fully blocked aromatic diisocyanate adducts, catalysts, alcohols and alkylene carbonates are of good compatibility and stability. It is also surprising, and was not foreseeable, that the substantially cresol-free wire-coating compositions lead to wire coatings having outstanding technological properties, for instance a flux time of less than 2 seconds at a temperature of 375° C. The wire-coating compositions according to the invention have high solids contents at a viscosity which is favorable for processing. In addition, they are substantially free of cresols, so that the compositions according to the invention reduce the environmental pollution when baking the compositions. In addition, the coatings obtained from the wire-coating compositions according to the invention exhibit good adhesion and an adequate heat shock.

The individual components of the wire-coating compositions according to the invention are now first to be explained in more detail below.

The hydroxyl group-containing polyesters (component A) are already known and are described, for example, in DE-A-28 40 352 and DE-A-25 45 912. The polyester resins are prepared in a known manner by esterification of polybasic carboxylic acids with polyhydric alcohols in the presence of suitable catalysts. In place of the free acid, it is also possible to use ester-forming derivatives thereof. Alcohols suitable for the preparation of the polyesters are, for example, ethylene glycol, 1,2-propylene glycol, 1,3-propylene glycol, butane-1,2-diol, butane-1,3-diol, butane-1,4-diol, pentane-1,5-diol, neopentylglycol, diethylene glycol, triethylene glycol and triols, for example glycerol, trimethylolethane, trimethylolpropane and tris-2-hydroxyethyl isocyanurate.

Preference is given to employing mixtures of ethylene glycol and tris-2-hydroxyethyl isocyanurate. The use of tris-2-hydroxyethyl isocyanurate leads to high softening temperatures of the coating film.

Examples of suitable carboxylic acids are phthalic acid, isophthalic acid, terephthalic acid and their esterifiable derivatives, for example the anhydrides, where they exist, and the lower alkyl esters of the stated acids, for example methyl, ethyl, propyl, butyl, amyl, hexyl and octyl phthalates, terephthalates and isophthalates. It is also possible to employ the semi-esters, the dialkyl esters and mixtures of these compounds. A further possibility is the employment of the corresponding acid halides of these compounds.

Catalysts which are suitable for the preparation of the polyesters, and which are employed in quantities of from 0.01 to 5% by weight, based on the feed mixture, are conventional esterification catalysts. Examples of suitable catalysts are heavy metal salts such as lead acetate or zinc acetate, and also organic titanates, for example triethanolamine titanate, cerium compounds and organic acids, for example p-toluenesulfonic acid.

The hydroxyl group-containing polyesters (component A) have in general a hydroxyl number in the range from 200 to 900 mg of KOH/g, preferably from 250 to 750 mg of KOH/g. The polyesters are employed in a proportion of from 7 to 25% by weight, based on the overall weight of the wire-coating compositions.

They can be prepared by the known methods of melt condensation or by solution condensation in an adequate solvent, for example N-methylpyrrolidone, methyldiglycol, ethyldiglycol and ethylene glycol.

One example of a suitable polyester (component A) is the product obtainable under the trade name Desmophen 600 (manufacturer: Bayer AG).

The present invention employs as component B) from 55 to 70% by weight of a fully blocked aromatic diisocyanate adduct or of a plurality of fully blocked aromatic diisocyanate adducts. Aromatic diisocyanates are to be understood as those isocyanates in which the NCO group is attached to an aromatic structure. The isocyanate adducts are prepared, for example, by reacting an aromatic diisocyanate with a polyol, the quantities of these compounds being chosen such that the isocyanate groups are in excess. The residual, free isocyanate groups of this adduct are reacted with a blocking agent. However, it is of course also possible for the isocyanates to be reacted first with the blocking agent and for the residual, free isocyanate groups to be reacted with the polyol component.

The synthesis of the isocyanate adduct is advantageously carried out in a solvent which is inert toward isocyanate groups and has good solvency for the polyurethane which is formed, in the presence of a catalyst at temperatures of from 30° to 120° C.

Examples of suitable aromatic diisocyanates are 1,3-phenylene diisocyanate, 1,4-phenylene diisocyanate, 2,5-tolylene diisocyanate, 2,6-tolylene diisocynate, 4,4'-bisphenylene diisocyanate, 1,5-naphthylene diisocyanate, 1,4-naphthylene diisocyanate, 4,4'-diphenylmethane diisocyanate and 2,4'-diphenylmethane diisocyanate. It is particularly preferred to employ as the aromatic diisocyanate of component B) 4,4'-diphenylmethane diisocyanate or a mixture of 4,4'-diphenylmethane diisocyanate and 2,4'-diphenylmethane diisocyanate.

Examples of polyols which are suitable for forming the adduct are trimethylolpropane, neopentylglycol, butane-1,3-diol, butane-1,4-diol, glycerol, hexanetriol, pentaaerythritol [sic] and glycols, for example ethylene glycol and propylene glycol.

Suitable agents for blocking the free isocyanate groups are all known blocking agents, although it is necessary to ensure that deblocking occurs only at temperatures above 120° C. Examples of suitable compounds are aliphatic, cycloaliphatic or aromatic alcohols, for example butanol, isobutanol, 2-ethylhexanol, cylcohexanol [sic], cyclopentanol, benzyl alcohol, phenols and cresols; β-hydroxyalkyl ethers, for example methyl, ethyl and butyl glycol; amines, for example di-n-butylamine and di-n-hexylamine; oximes, for example methyl ethyl ketoxime and diethyl ketoxime; hydroxylamines and lactams, for example ε-caprolactam, and other compounds containing a hydrogen atom whose reactivity permits reaction of the blocking agent with the isocyanate.

It is particularly preferred to employ as component B) a reaction product of 4,4'-diphenylmethane diisocyanate or of a mixture of 4,4'-diphenylmethane diisocyanate and 2,4'-diphenylmethane diisocyanate with trimethylolpropane, butane-1,3-diol and phenol, the isocyanate groups of the 4,4'-diphenylmethane diisocyanate and/or of the 2,4'-diphenylmethane diisocyanate being present in fully blocked form. Isocyanate adducts of this kind are available on the market, for example under the trade name Coronate 2503 (manufacturer: Nippon Polyurethane Co., Ltd.).

The blocking agents particularly preferably employed are phenols, especially xylenols and cresols.

Of very particular preference in the context of this invention are solderable wire-coating compositions in which component B) is used [sic] by reacting 4,4'-diphenylmethane diisocyanate or a mixture of 4,4'-diphenylmethane diisocyanate and 2,4'-diphenylmethane diisocyanate with trimethylolpropane, butane-1,3-diol and cresols and/or xylenols, the molar ratio of the polyols and the diisocyanate component being 1:(2-4) and the ratio of the sum of the alcoholic and phenolic OH groups to the isocyanate groups of the 4,4'-diphenylmethane diisocyanate and/or of the 2,4'-diphenylmethane diisocyanate being at least 1.1.

The isocyanate adducts are preferably prepared in a two-stage process, by first reacting the polyols with the diisocyanate component and then blocking the remaining, free isocyanate groups with the phenol component. For example, the polyols can be reacted with the isocyanate component in a suitable organic solvent, for example 1-methoxy-2-propyl acetate or methyl isobutyl ketone, at temperatures of about 80° C. (1st stage) and then the remaining, free isocyanate groups can be blocked with the phenol component (2nd stage). This reaction is preferably carried out without catalysts. After the first and the second reaction stage the end of the reaction is in each case checked for on the basis of the NCO content.

A further possible preparation process comprises first reacting the diphenylmethane diisocyanate with the blocking agent and then carrying out a reaction with the polyol component.

The catalyst component C) of the solderable wire-coating compositions according to the invention is used in a proportion of from 0.1 to 3% by weight, based on the overall weight of the wire enamels. The catalyst is preferably selected from the group of metal octanoates and metal naphthenates. Examples are lead octanoate, calcium octanoate, cerium octanoate, cobalt octanoate, manganese octanoate, zinc octanoate, zirconium octanoate and lead naphthenate. Further suitable catalysts are butyl titanates.

The solderable wire-coating compositions according to the invention contain from 1 to 8% by weight, based on the overall weight of the wire-coating compositions, of a polyol or of a plurality of polyols (D). Examples of suitable alcohols are ethylene glycol, 1,2- and 1,3-propylene glycol, butane-1,2-, -1,3- and -1,4-diol, pentane-1,5-diol, neopentylglycol, diethylene glycol and triethylene glycol. Diethylene glycol is particularly preferably used as component D). The alcohol component D) has an influence on evenness and flexibility in the resulting wire enamel coatings. The alcohol component D) should have a boiling points [sic] of at least 180° C.

The wire-coating compositions according to the invention contain from 1 to 36.9% by weight, based on the overall weight of the wire-coating compositions, of an alkylene carbonate or of a plurality of alkyl caronates [sic] (E) of the formula (I)

$$\begin{array}{c} R-CH-CH_2 \\ | \quad\quad | \\ O \quad\quad O \\ \backslash \quad / \\ C \\ \| \\ O \end{array} \quad (I)$$

where R denotes either hydrogen or an aliphatic or a cycloaliphatic or an aromatic or an alkylaromatic radical. Examples of suitable cyclic carbonates of the formula (I) are ethylene carbonate, propylene carbonate, isobutylene carbonate and 4-phenyl-1,3-dioxol-2-ane [sic]. Propylene carbonate is employed with particular preference.

In addition, the wire-coating compositions according to the invention can also contain conventional auxiliaries and additives in conventional quantities, for example in a proportion of up to 1% by weight based on the solids content of the wire-coating compositions. Examples of auxiliaries which can be employed for the wire-coating compositions are flow-improving phenolic: or melamine resins or other conventional leveling agents, for example those based on polyacrylates.

The wire-coating compositions are prepared by the conventional processes.

The wire-coating compositions according to the invention are applied, using conventional wire coating machines for casting resins, and cured. Such wire coating machines are known and therefore require no further discussion.

The casting resins according to the invention are stable on storage. The wires coated from the melt with the coating compositions according to the invention have a short flux time. A comparison of the coating compositions according to the invention with comparable compositions according to JP-A 58-101 162 (see Examples 7–9 of JP-A 58-101 162 in which, by analogy with the examples described below, the isocyanate adduct having the trade name Coronate 2503, manufactured by Nippon Polyurethane, is used) shows that the casting resins according to the invention have a shorter flux time. In addition, the coatings obtained from the casting resins according to the invention are distinguished by an outstanding adhesion to copper wires and by very good thermal shock properties.

The invention is illustrated in more detail below with reference to illustrative embodiments. In these examples, all parts and percentages are by weight unless expressly stated otherwise.

A) Preparation of an isophthalic acid polyester:

194.54 g of ethylene glycol, 329.7 g of glycerol, 475.43 g of isophthalic acid and 0.30 g of tin(II) oxalate are heated to 220° C. to prepare polyester resins having a hydroxyl number in the range from 660 to 760 mg of KOH/g.

EXAMPLE 1

43.05 g of diethylene glycol and 121.47 g of the isophthalic acid polyester prepared under A) are added to 100 g of propylene carbonate, with continual stirring. After the dissolution step with stirring at from 20° C. to 150° C., preferably from 110° C. to 130° C., 645.81 g of the isocyanate adduct having the trade name Coronate 2503 (manufacturer: Nippon Polyurethane) are added in portions and the mixture is stirred at this temperature until complete dissolution has been achieved. The solution is then brought to a temperature of from 100° to 110° C., and 7.46 g of zinc octanoate and 82.21 g of propylene carbonate are added. The mixture is stirred for one hour at this temperature and then filtered through a metal sieve and cooled.

Viscosity at 120° C.: 400 mPas

Viscosity at 23° C.: >10,000 mPas

Solids content (1 g, 1 h, 180° C.): 62.6%

The resin is stable on storage for months.

EXAMPLE 2

40.93 g of diethylene glycol and 206.62 g of the polyester having the trade name Desmophen 600 (manufacturer: Bayer AG) are added to 100 g of propylene carbonate, with continual stirring. After dissolution with stirring at from 20° C. to 150° C., preferably from 110° C. to 130° C., 612.06 g of the isocyanate adduct obtainable under the trade name Coronate 2503 (manufacturer: Nippon Polyurethane) are added in portions and the mixture is stirred at this temperature until complete dissolution has occurred. The mixture is heated to a temperature of from 100° to 110° C., and 7.06 g of zinc octanoate and 33.33 g of propylene carbonate are added. The mixture is stirred for one hour and then filtered through a metal sieve and cooled.

Viscosity at 120° C.: 500 mPas

Viscosity at 23° C.: >10,000 mPas

Solids content: (1 g 1 h 200° C.): 65.3%

The resin is stable on storage for months.

COMPARATIVE EXAMPLE

A coating formulation prepared in accordance with Example 1 from 143.05 g of cresol, 121.47 g of the isophthalic acid polyester prepared under A), 645.81 g of the isocyanate adduct having the trade name Coronate 2503, 7.46 g of zinc octanoate and 82.21 g of cresol is turbid and of inadequate coatability on a wire coating system conventional for casting resins.

The wire-coating compositions described in Examples 1 and 2 are applied on a casting resin coating machine.

Coating conditions:

Oven: FLA 290, Aumann

Oven length: 2.9 m

Oven temperature: 410° to 460° C.

Application system: Jets

Temperature of application system: 80° to 120° C.

Take-off speed: 12 to 40 m/min
Wire diameter: 0.71 mm
Number of resin applications: 4
Degree of increase: 2 L The coated wires are tested in accordance with IEC 851. Also tested is the resistance of the polyurethane-coated wires to crazing. This test, carried out on the basis of JIS Standard No. 3303, is described in S. Masuda, N. Asano, Sumitomo Electric Technical Rev. 17 (1977) 32.

The results are summarized in the following Table.

|  | Example 1 | Example 2 | Comparative Example |
|---|---|---|---|
| Surface | very good | good | unable to be processed adequately |
| Adhesion on winding, 1 × d + pre-extension | 25% | 15% |  |
| Thermal shock 1 × d, 30 min | 155° C. | 155° C. |  |
| Softening temperature | 240° C. | 250° C. |  |
| tan δ steep rise | 94° C. | 108° C. |  |
| Hardness | 4–5 H | 4 H |  |
| Crazing resistance | satisfactory | satisfactory |  |
| Solderability |  |  |  |
| 420° C. | 1.1 sec | 0.9 sec |  |
| 375° C. | 1.5 sec | 1.5 sec |  |
| 360° C. | 2.3 sec | 2.3 sec |  |

We claim:

1. Solderable hot melt wire-coating compositions based on hydroxyl group-containing polyesters, blocked polyisocyanates, organic solvents and catalysts, wherein the wire-coating compositions consist essentially of
   A) from 7 to 25% by weight of hydroxyl group-containing polyesters,
   B) from 55 to 70% by weight of a fully blocked aromatic diisocyanate adduct or of a plurality of fully blocked aromatic diisocyanate adducts,
   C) from 0.1 to 3% by weight of catalysts,
   D) from 1 to 8% by weight of a polyol or of a plurality of polyols, and
   E) from 1 to 36.9% by weight of an alkylene carbonate or of a plurality of alkylene carbonates,
   the total weight of the wire-coating compositions in each case being 100% by weight wherein the coating composition has a solids content of at least 62%, a viscosity of at least 400 mPas at 120° C. and a flux time of less than 2 seconds at a temperature of 375° C.

2. Solderable wire-coating compositions according to claim 1, wherein the aromatic diisocyanate of component B) is selected from the group consisting of 4,4'-diphenylmethane diisocyanate, and a mixture of 4,4'-diphenylmethane diisocyanate and 2,4'-diphenyl-methane diisocyanate.

3. Solderable wire-coating compositions according to claim 1 wherein component B) is a reaction product of a diisocyanate and trimethylolpropane, butane-1,3-diol and phenols, where the isocyanate groups of the diisocyanate are present in fully blocked form.

4. Solderable wire-coating compositions according to claim 3, wherein component B) is obtained by reacting a compound selected from the group consisting of 4,4'-diphenylmethane diisocyanate and a mixture of 4,4'-diphenylmethane diisocyanate and 2,4'-diphenylmethane diisocyanate, with trimethylolpropane, butane-1,3-diol and cresols and/or xylenols, the molar ratio of the polyols and the diisocyanate component being between 1:2 and 1:4 and the ratio of the sum of the alcoholic and phenolic OH groups to the isocyanate groups of the diisocyanate(s) being at least 1.1.

5. Solderable wire-coating compositions according to claim 1, wherein diethylene glycol is used as component D).

6. Solderable wire-coating compositions according to claim 1, wherein propylene carbonate is used as alkylene carbonate E).

7. Solderable wire-coating compositions according to claim 1, wherein the catalyst C) used is selected from the group consisting of metal octanoates and metal naphthenates.

8. Solderable wire coating compositions according to claim 2, wherein component B) is a reaction product of the diisocyanates with trimethylolpropane, butane-1,3-diol and phenols, wherein the isocyanate groups on the diisocyanates are fully blocked.

9. A process for the continuous coating of wires, comprising applying a hot melt wire-coating composition to the surface of the wire followed by baking, wherein the coating composition applied to the wire consists essentially of
   A) from 7 to 25% by weight of hydroxyl group-containing polyesters,
   B) from 55 to 70% by weight of a fully blocked aromatic diisocyanate adduct or of a plurality of fully blocked aromatic diisocyanate adducts,
   C) from 0.1 to 3% by weight of catalysts,
   D) from 1 to 8% by weight of a polyol or of a plurality of polyols, and
   E) from 1 to 36.9% by weight of an alkylene carbonate or of a plurality of alkylene carbonates,
   the total weight of the wire-coating compositions in each case being 100% by weight, wherein the coating composition has a solids content of at least 62%, a viscosity of at least 400 mPas at 120° C. and a flux time of less than 2 seconds at a temperature of 375° C.

* * * * *